United States Patent
Yang et al.

(10) Patent No.: US 7,415,554 B2
(45) Date of Patent: Aug. 19, 2008

(54) SYSTEM AND METHOD FOR PARALLEL DATA TRANSMISSION

(75) Inventors: Jen-Ta Yang, Taipei County (TW); Rei-Hong Chang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 11/162,866

(22) Filed: Sep. 27, 2005

(65) Prior Publication Data

US 2007/0067526 A1    Mar. 22, 2007

(30) Foreign Application Priority Data

Aug. 16, 2005  (KR)  ............... 94127842 A

(51) Int. Cl.
G06F 13/38  (2006.01)
G06F 3/00  (2006.01)
(52) U.S. Cl. ........................................ 710/110; 710/19
(58) Field of Classification Search .................. 710/19, 710/110, 105, 106
See application file for complete search history.

(56) References Cited

U.S. PATENT DOCUMENTS

| | | | | |
|---|---|---|---|---|
| 4,689,740 A | | 8/1987 | Moelands et al. | 364/200 |
| 4,949,241 A | * | 8/1990 | Iwasaki et al. | 710/110 |
| 5,070,443 A | * | 12/1991 | Priem et al. | 710/105 |
| 5,481,675 A | * | 1/1996 | Kapogiannis et al. | 709/235 |
| 6,173,354 B1 | * | 1/2001 | Khandekar et al. | 710/311 |
| 6,456,538 B1 | * | 9/2002 | Song et al. | 365/189.01 |
| 6,463,494 B1 | * | 10/2002 | Morriss et al. | 710/305 |
| 7,079,445 B2 | * | 7/2006 | Choi et al. | 365/233 |
| 2004/0260969 A1 | * | 12/2004 | Mylly | 714/5 |

* cited by examiner

*Primary Examiner*—Glenn A. Auve
*Assistant Examiner*—Trisha Vu
(74) *Attorney, Agent, or Firm*—Jianq Chyun IP Office

(57) ABSTRACT

A system for parallel data transmission including a master device and a slave device is provided. The master device includes a first and a second I/O ports for outputting a read signal and a write signal, respectively. The slave device includes a third and a fourth I/O ports electrically coupled to the first and the second I/O ports, respectively. When the master device outputs the read or the write signal, the slave device transmits status information of the slave device to the master device after the master device has transmitted an address latch enable signal and before the slave device receives the address latch enable signal which is active. The master device outputs an address signal after transmitting the address latch enable signal and latches the address signal for the addressing for reading or writing data after the slave device has received the address latch enable signal.

14 Claims, 2 Drawing Sheets

SYSTEM AND METHOD FOR PARALLEL DATA TRANSMISSION

CROSS-REFERENCE TO RELATED APPLICATION

This application claims the priority benefit of Taiwan application serial no. 94127842, filed on Aug. 16, 2005. All disclosure of the Taiwan application is incorporated herein by reference.

BACKGROUND OF THE INVENTION

1. Field of the Invention

The present invention relates to a system for parallel data transmission, and more particularly, to a system and a method for parallel data transmission in which the data transmission is controlled by a master device according to the status of a slave device.

2. Description of the Related Art

FIG. 1 is a block diagram of a conventional system for parallel data transmission. In FIG. 1, the system for parallel data transmission 10 includes a master device 11 and a slave device 13, wherein the master device 11 can be a microcontroller, and the slave device 13 can be an external memory device (e.g. a program memory, a data memory, or a peripheral device). An address signal add is transmitted through an address bus and a data signal da is transmitted in parallel through a data bus between the master device 11 and the slave device 13. In addition, unidirectional control signals such as a read signal rd. a write signal wr and an address latch enable signal ale are also transmitted between the master device 11 and the slave device 13. That is, the control signals are transmitted only from the master device 11 to the slave device 1 3.

FIG. 2 is a timing diagram indicating the signal transmission in the system for parallel data transmission 10 of FIG. 1. In FIG. 2, when the master device 11 intends to read the data from the slave device 13, the master device 11 first transmits an address latch enable signal ale at time point $T_1$, and then transmits the address of the data to be read (i.e. the address signal add) to the address bus at time point $T_2$. Then, the slave device 13 latches the address signal add after it has been received at time point $T_3$. When the master device 11 transmits the read signal rd at time point $T_4$, the slave device 13 transmits data corresponding to the latched address (i.e. the data signal da) to the data bus after the slave device 13 has received the read signal rd at time point $T_5$. Finally, the master device 11 reads the data signal da at time point $T_6$.

Similarly, when the master device 11 intends to write data to the slave device 13, the master device 11 first transmits the address latch enable signal ale at time point $T_1$, and then transmits the address of the data to be written (i.e. the address signal add) to the address bus at time point $T_2$. Then, the slave device 13 latches the address signal add after it has been received at time point $T_3$. When the master device 11 transmits the write signal wr at time point $T_4$, the master device 11 transmits the data to be written (i.e. the data signal da) to the data bus at time point $T_5$. Finally, after the slave device 13 has received the write signal wr, the data signal da is written to positions corresponding to the latched address at time point $T_6$.

When the slave device 13 malfunctions or does not exist, the conventional method mentioned above is not able to resolve the problem of erroneous read/write operation because the status of the slave device 13 is not known by the master device 11, and the whole system may fail to function properly in such a situation.

SUMMARY OF THE INVENTION

Therefore, it is one object of the present invention to provide a system and a method for parallel data transmission, such that the status of the slave device is known by the master device, and the problem of erroneous read/write operation in the whole system is effectively eliminated.

In order to achieve the object mentioned above and others, a system and a method for parallel data transmission are provided by the present invention. The system for parallel data transmission includes a master device and a slave device, wherein the master device includes a first I/O port for outputting a read signal and a second I/O port for outputting a write signal. The slave device includes a third I/O port electrically coupled to the first I/O port and a fourth I/O port electrically coupled to the second I/O port. When the master device outputs the read or the write signal, the slave device transmits status information of the slave device to the master device through the third and the fourth I/O ports during the time period after the master device has transmitted an address latch enable signal and before the slave device receives the address latch enable signal which is active. The master device outputs an address signal after transmitting the address latch enable signal and latches the address signal for the addressing of the reading or writing data after the slave device has received the address latch enable signal.

In the present invention, the information indicating whether the slave device is normally operated is transmitted to the master device during a certain period of the read and write signals, such that the master device can avoid to perform erroneous read/write operation onto the slave device.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1:
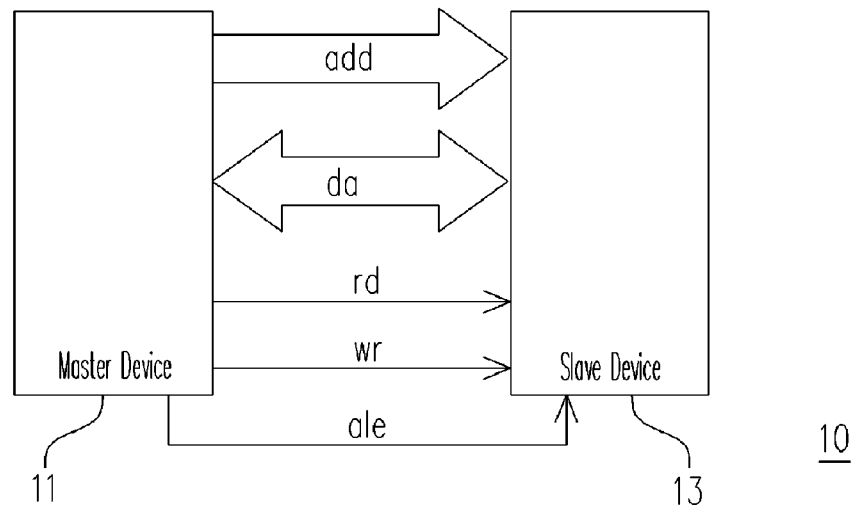
FIG. 1 is a block diagram of a conventional system for parallel data transmission.
Figure 2:
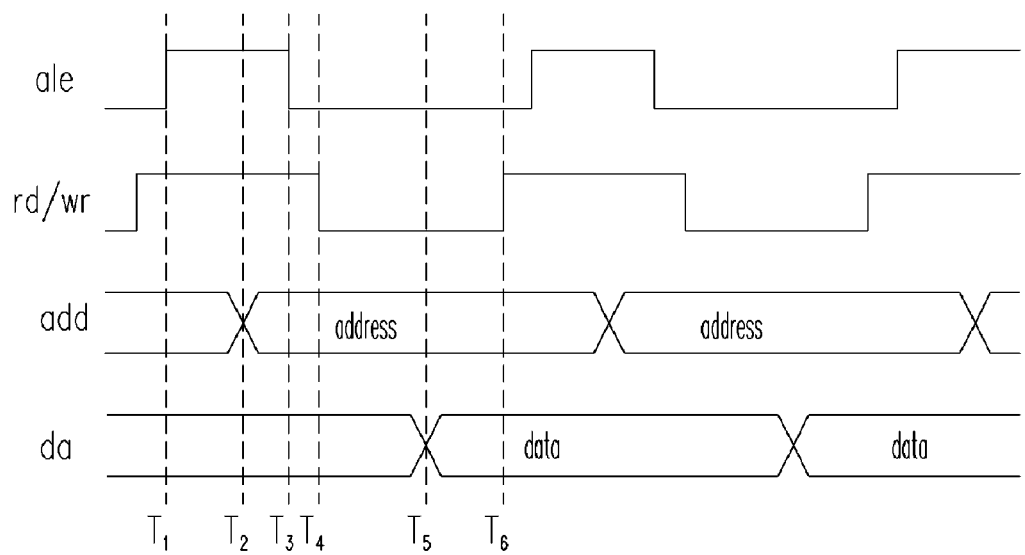
FIG. 2 is a timing diagram indicating the signal transmission in the system for parallel data transmission of FIG. 1.
Figure 3:
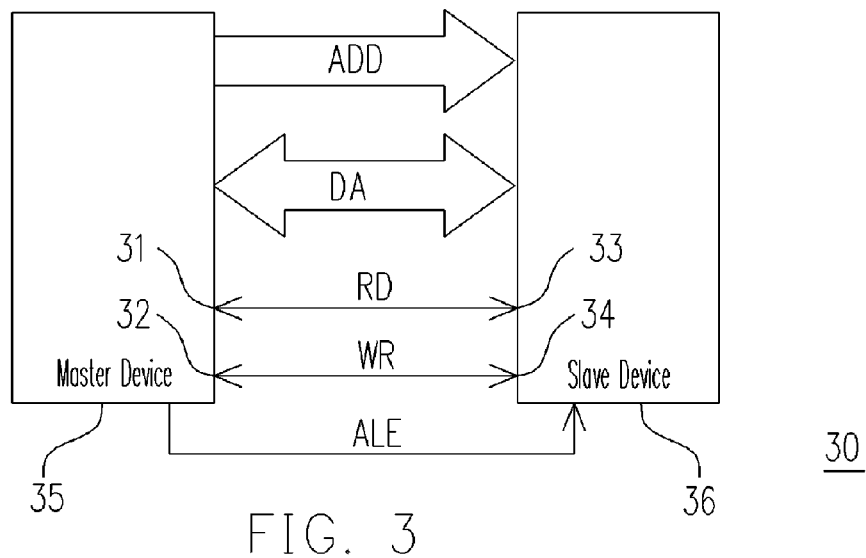
FIG. 3 is a block diagram of a system for parallel data transmission according to one embodiment of the present invention.

FIG. 3 is a block diagram of a system for parallel data transmission according to one embodiment of the present invention. In FIG. 3, the system for parallel data transmission 30 includes a master device 35 and a slave device 36, wherein the master device 35 can be a microcontroller, and the slave device 36 can be an external memory device (e.g. a program memory, a data memory, or a peripheral device). An address signal ADD is transmitted through an address bus and a data signal DA is transmitted in parallel through a data bus between the master device 35 and the slave device 36. Control signals such as a read signal RD, a write signal WR and an address latch enable signal Ale are also transmitted between the master device 35 and the slave device 36.

The master device 35 transmits the read signal RD through a first I/O port 31, and the slave device 36 receives the read signal RD through a third I/O port 33. In addition, the master device 35 transmits the write signal WR through a second I/O port 32, and the slave device 36 receives the write signal WR through a fourth I/O port 34. Moreover, the slave device 36 transmits status information indicating whether the slave device 36 is operating normally through the I/O ports 33 and 34. The master device 35 receives the status information through the I/O ports 31 and 32, and determines whether to perform the read/write operation onto the slave device 36.

Figure 4:
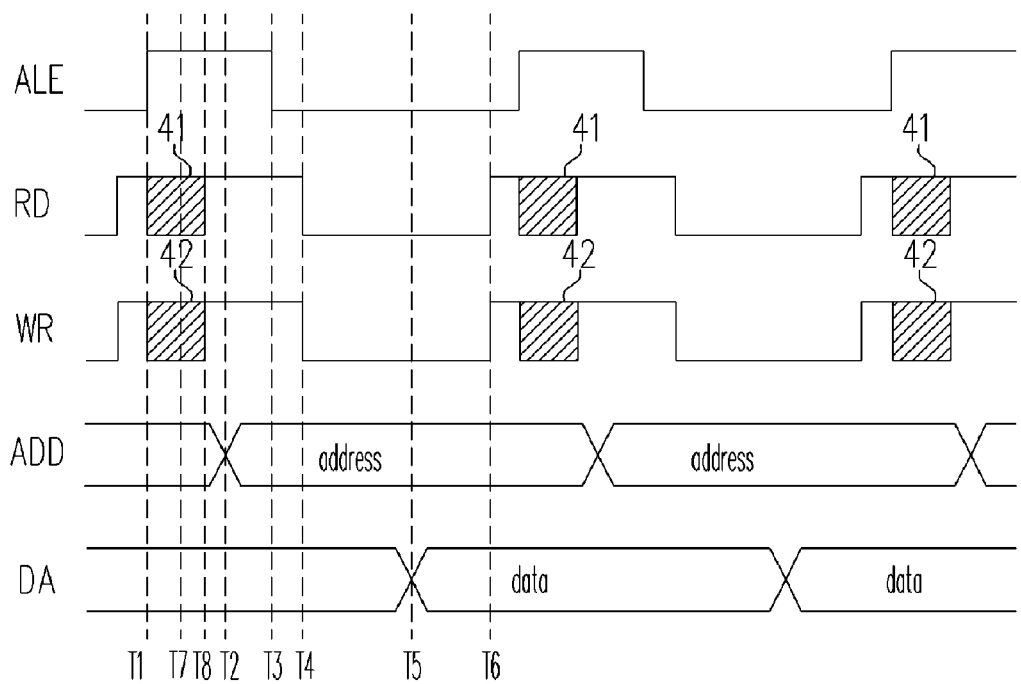
FIG. 4 is a timing diagram indicating the signal transmission in the system for parallel data transmission of FIG. 3.

FIG. 4 is a timing diagram indicating the signal transmission in the system for parallel data transmission 30 of FIG. 3. In FIG. 3 and FIG. 4, when the master device 35 intends to read the data from the slave device 36, the master device 35 transmits the address latch enable signal ALE at time point Ti. Before the slave device 36 receives the address latch enable signal ALE which is active (i.e. before the time point T3), the slave device 36 transmits the status information of the slave device 36 through the I/O ports 33 and 34 during a period 41 of the read signal RD and a period 42 of the write signal WR.

Then, the master device 35 receives the status information and recognizes whether the slave device 36 is normally operating at time point T7. For example, if the information contained in both the periods 41 and 42 is logic high, the slave device 36 is not operating normally. In other cases, for example, if the information contained in both the periods 41 and 42 is logic low, or one is logic high and the other one is logic low, the slave device 36 is regarded as operated in other status.

Afterwards, the read signal RD and write signal WR return to the original status at time point T8, for example, they return to the logic high in the present case. Then, if the slave device 36 is normally operating, the slave device 36 transmits the address of the data to be read (i.e. the address signal ADD to the address bus at time point T2. Then, the slave device 36 latches the address signal ADD after the slave device 36 has been received the address latch enable signal ALE which is active at time point T3. When the slave device 36 has been received the read signal RD which is active at time point T4, the slave device 36 transmits the data corresponding to the latched address signal ADD (i.e. the data signal DA) to the data bus at time point T5. Finally, the master device 35 reads the data signal DA from the data bus at time point T6.

Similarly, when the master device 35 intends to write the data to the slave device 36, the master device 35 transmits the address latch enable signal ALE at time point Ti. Then, before the slave device 36 receives the address latch enable signal ALE which is active (i.e. before the time point T3), the slave device 36 transmits the status information of the slave device 36 through the I/O ports 33 and 34 during the periods 41 and 42. Finally, the master device 35 receives the status information instructing whether the slave device 36 is normally operating at time point T7.

Afterwards, if the slave device 36 is normally operating, the slave device 36 transmits the address of the data to be written (i.e. the address signal ADD) to the address bus at time point T2. Then, the slave device 36 latches the address signal ADD after the slave device 36 has been received the address latch enable signal ALE which is active at time point T3. After the slave device 36 has received the write signal WR which is active at time point T4, the slave device 36 transmits the data to be written (i.e. the data signal DA) to the data bus at time point T5. Finally, the slave device 36 writes the data signal DA to positions corresponding to the latched address at time point T6.

It is to be noted that in the timing diagram FIG. 4, the address latch enable signal ALE, the read signal RD and the write signal WR are regarded as active for the slave device 36 when it is logic low, which means that the address signal ADD transmitted from the master device 35 on the address bus is latched by the slave device 36 only when the address latch enable signal ALE received by the slave device 36 is changed from logic high to logic low. However, the address latch enable signal ALE, the read signal RD and the write signal WR may be designed as active when it is logic high. Alternatively, part of the signals mentioned above may be regarded as active when it is logic high, whereas the other part of the signals may be regarded as active when it is logic low. Moreover, in fact the read signal RD and the write signal WR cannot be active at the same time. FIG. 4 shows that the status information is transmitted by the slave device 36 through the periods 41 and 42.

In summary, in the system and method for parallel data transmission of the present invention, the status information of the slave device is transmitted by the slave device during a certain period of the read and write signals, such that the master device can understand whether the slave device is operating normally and can further determine whether to perform the read/write operation onto the slave device, such that erroneous read/write operation is effectively eliminated throughout the whole system.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A system for parallel data transmission, comprising:
a master device comprising a first I/O port for outputting a read signal and a second I/O port for outputting a write signal; and
a slave device comprising a third I/O port electrically coupled to the first I/O port for receiving the read signal and a fourth I/O port electrically coupled to the second I/O port for receiving the write signal, wherein after the master device outputs the read signal instructing that the master device reads data from the slave device or outputs the write signal instructing that the master device writes data to the slave device, the slave device transmits status information of the slave device to the master device through the third and the fourth I/O ports during the duty cycle of an address latch enable signal which is transmitted by the master device, wherein the master device, wherein the master device transmits an address signal after the address latch enable signal is enabled, and the slave device has latched the address signal for the addressing for reading or writing data after the address latch enable signal is disabled.

2. The system for parallel data transmission of claim 1, wherein during the process of the master device reading data from the slave device, after the master device has transmitted the address latch enable signal, the status information transmitted by the slave device is received by the master device through the first and the second I/O ports for determining whether the slave device is normally operating, and if it is determined that the slave device is normally operating, the address signal is transmitted to an address bus.

3. The system for parallel data transmission of claim 2, wherein after the slave device has received the address latch enable signal which is active, the slave device latches the address signal on the address bus; and after the slave device has received the read signal which is active, the slave device transmits a data signal corresponding to the address signal to a data bus, and then the master device reads the data signal from the data bus.

4. The system for parallel data transmission of claim 1, wherein during the process of the master device writing data to the slave device, after the master device has transmitted the address latch enable signal, the status information transmitted by the slave device is received through the first and the second I/O ports for determining whether the slave device is normally operating, and if it is determined that the slave device is normally operating, the address signal is transmitted to an address bus.

5. The system for parallel data transmission of claim 4, wherein before the slave device has received the address latch enable signal which is active, the master device transmits a data signal to a data bus; after the slave device has received the address latch enable signal which is active, the slave device latches the address signal on the address bus; and after the slave device has received the write signal which is active, the slave device writes the data signal to positions corresponding to the address signal.

6. The system for parallel data transmission of claim 1, wherein the master device comprises a microcontroller.

7. The system for parallel data transmission of claim 1, wherein the slave device comprises an external memory device.

8. A method for parallel data transmission suitable for a system for parallel data transmission, wherein the system for parallel data transmission comprises a master device and a slave device, in which an address signal is transmitted through an address bus and a data signal is transmitted through a data bus between the master device and the slave device, wherein the master device comprises a first and a second I/O ports, and the slave device comprises a third and a fourth 1/0 ports electrically coupled to the first and the second I/O ports respectively, the method for parallel data transmission comprising:

after the master device outputs a read signal instructing that the master device reads data from the slave device at outputs a write signal instructing that the master device writes data to the slave device, the slave device transmits status information of the slave device to the master device through the third and the fourth I/O ports during the duty cycle of an address latch enable signal which is transmitted by the master device, wherein the master device transmits the address signal after the address latch enable signal is enabled, and the slave device latches the address signal for the addressing for reading or writing data after the address latch enable signal is disabled.

9. The method for parallel data transmission of claim 8, wherein during the process of the master device reading data from the slave device, after the master device has transmitted the address latch enable signal, the status information transmitted by to slave device is received by the master device through the first and the second I/O ports for determining whether the slave device is normally operating, and if it is determined that the slave device is normally operating, the address signal is transmitted to the address bus.

10. The method for parallel data transmission of claim 9, wherein after the slave device has received the address latch enable signal which is active, the slave device latches the address signal transmitted on the address bus; and after the slave device has received the read signal which is active, the slave device transmits the data signal corresponding to the address signal to the data bus, and then the master device reads the data signal from the data bus.

11. The method for parallel data transmission of claim 8, wherein during the process of the master device writing data to the slave device, after the master device has transmitted the address latch enable signal, the status information transmitted by the slave device is received through the first and the second I/O ports for determining whether the slave device is operating normally, and if it is determined that the slave device is operating normally, the address signal is transmitted to the address bus.

12. The method for parallel data transmission of claim 11, wherein before the slave device has received the address latch enable signal which is active, the master device transmits the data signal to the data bus; after the slave device has received the address latch enable signal which is active, the slave device latches the address signal on the address bus; and after the slave device has received the write signal which is active, the slave device writes the data signal to positions corresponding to the address signal.

13. The method for parallel data transmission of claim 8, wherein the master device comprises a microcontroller.

14. The method for parallel data transmission of claim 8, wherein the slave device comprises an external memory device.

* * * * *